UNITED STATES PATENT OFFICE.

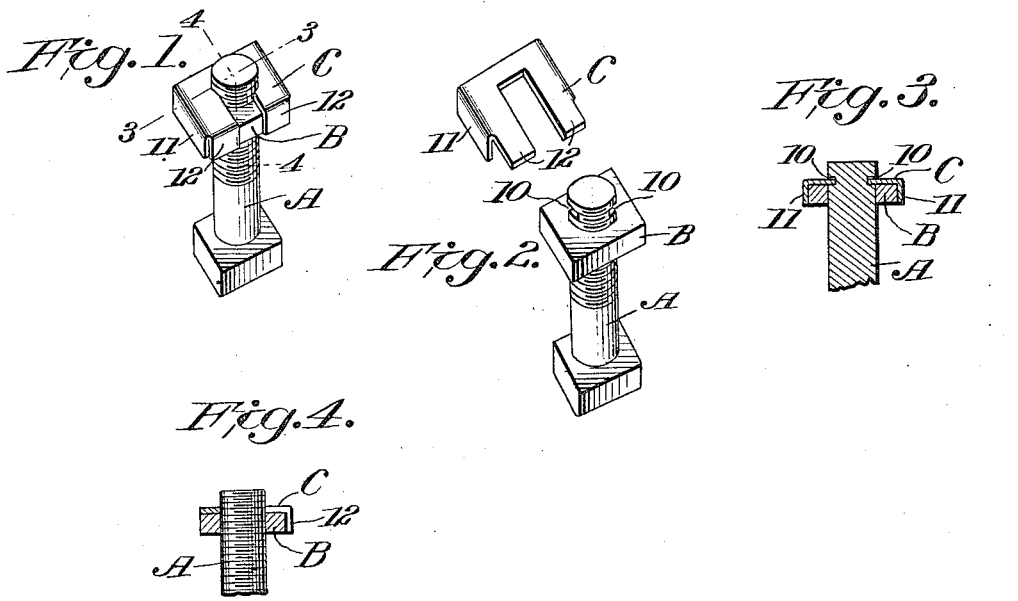

HARRY A. KIENE, OF INDIANAPOLIS, INDIANA.

NUT-LOCK.

1,045,797.  Specification of Letters Patent.  Patented Nov. 26, 1912.

Application filed March 14, 1912. Serial No. 683,782.

*To all whom it may concern:*

Be it known that I, HARRY A. KIENE, a citizen of the United States, residing at Indianapolis, Marion county, and State of Indiana, have invented and discovered certain new and useful Improvements in Nut-Locks, of which the following is a specification.

My said invention consists in certain improvements in the details of construction and arrangement of parts of devices for locking nuts on bolts, whereby a nut lock is provided of comparatively inexpensive construction, one that can be easily put in place and removed, and will be reliable and efficient in use, all as will be hereinafter more fully described and claimed.

Referring to the accompanying drawings, which are made a part hereof and on which similar reference characters indicate similar parts, Figure 1 is a perspective view of the bolt showing a nut secured thereon by the use of my said invention, Fig. 2 a perspective view of the nut locking plate and the nut and bolt, separated, Fig. 3 a section on the dotted line 3—3 in Fig. 1, and Fig. 4 a section on the dotted line 4—4 in Fig. 1.

In the drawings the portions marked A represent the bolt, B the nut and C the locking plate. The bolt A may be of any approved form and is formed with grooves 10 cut transversely near its point and on opposite sides thereof. The nut B is also of any approved form, adapted to turn onto the threaded end of the bolt. The locking plate C is preferably stamped out of a piece of sheet steel, or other appropriate material, and is formed with a slot in one side adapted to slide onto the bolt with its edges engaging the grooves 10 in opposite sides of the bolt. Said plate extends transversely from said slot a distance to overhang the sides of the nut, or has projecting ears which overhang the sides of the nut, which ears or projecting portions are indicated by the numeral 11 and are formed bent down to embrace the sides of the nut and hold it from turning. The points of the plate alongside the opened end of the slot therein are also extended to form ears 12 which are adapted to be bent down against the adjacent side of the nut and hold said plate from sliding back off said bolt.

Having thus fully described my said invention what I claim as new and desire to secure by Letters Patent is:

A nut lock comprising a bolt formed with transverse engaging grooves in opposite sides near its point, a plate formed with an open-end slot adapted to slide onto said bolt with the edges of the plate on each side of said slot engaging said grooves, said plate being formed with side pieces bent at right angles therewith and adapted to embrace the edges of the nut on opposite sides and hold the same from turning and with a projecting point adjacent to the open end of the slot in said plate adapted to be bent downward against the adjacent edge of the nut, which extends at an angle with the edges embraced by said side pieces, to hold said plate in position, substantially as set forth.

In witness whereof, I have hereunto set my hand and seal at Indianapolis, Indiana, this ninth day of March, A. D. nineteen hundred and twelve.

HARRY A. KIENE. [L. S.]

Witnesses:
E. W. BRADFORD,
T. A. BRADDOCK.

---

Copies of this patent may be obtained for five cents each, by addressing the "Commissioner of Patents, Washington, D. C."